Dec. 8, 1936.            J. R. ELSOM            2,063,495
ACCELERATING AND DECELERATING GAUGE
Filed Oct. 23, 1935
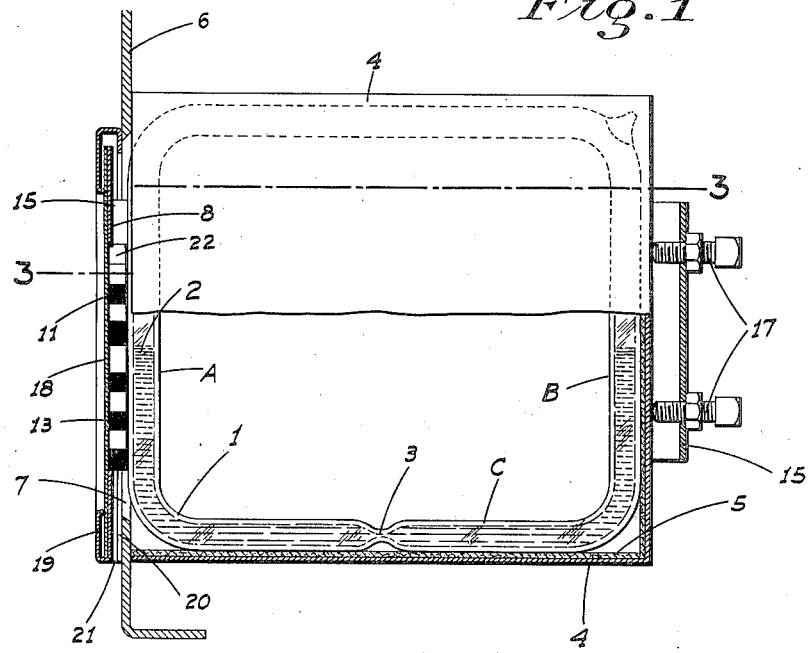
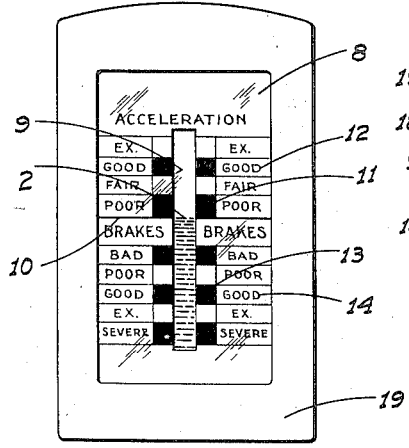
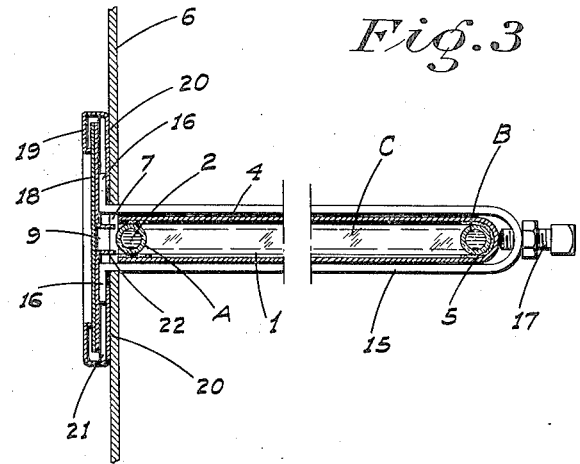
INVENTOR
J. R. Elsom
BY
ATTORNEY Patented Dec. 8, 1936

2,063,495

UNITED STATES PATENT OFFICE 2,063,495

ACCELERATING AND DECELERATING GAUGE

John R. Elsom, Fresno, Calif.

Application October 23, 1935, Serial No. 46,282

3 Claims. (Cl. 264—1)

This invention relates to gauges for use on motor vehicles, my principal object being to provide a gauge by means of which the efficiency or condition of a motor vehicle, both as regards to accelerating force of the engine and the decelerating or braking force of the brakes, will be instantly evident to the operator of the car whenever the brakes are applied or when the gas or accelerator pedal is depressed.

By means of this gauge, therefore, the driver of a car will be advised at all times as to the efficiency of his engine and brakes and he can take steps to remedy any defective or inefficient conditions which the gauge may show, without having to take the car to a shop and have tests made. This knowledge adds a factor of safety to driving, since at present many accidents occur because drivers assume that their brakes are efficient, whereas the contrary is actually the case; and because they attempt to pass other cars with little time or space to spare, under the assumption that the engine has plenty of "pick-up", whereas the engine is in fact operating sluggishly.

The gauge is designed to be mounted in connection with the instrument panel of the motor vehicle in such a position as to be readily viewed by the driver, and a further object of my invention is to provide a mounting means for the gauge arranged so that it is only necessary to cut a relatively small opening in the panel and the use of screws, etc., through the panel to hold the gauge in place, is unnecessary.

A further object of the invention is to produce a simple and inexpensive device and yet one which will be effective for the purpose for which it is designed.

These objects I accomplish by means of such structure and relative arrangement of parts as will fully appear by a perusal of the following specification and claims.

In the drawing similar characters of reference indicate corresponding parts in the several views:

Figure 1 is a sectional elevation of my improved gauge as mounted on the instrument panel of a motor vehicle.

Figure 2 is a face view of the scale of the gauge.

Figure 3 is a sectional plane on the line 3—3 of Fig. 1.

Referring now to the numerals of reference on the drawing, the gauge comprises an endless glass tube 1 preferably of rectangular form and including substantially vertical legs A and B spaced lengthwise of the vehicle and connected by a bottom leg C. A suitable liquid 2 is sealed in the tube to fill the leg C as well as to partly fill the legs A and B. The leg C is provided with a sharp constriction 3 intermediate its ends, so as to prevent undue surge of the liquid with ordinary car movements.

The tube is enclosed in a metal sheath 4, which may be lined with felt 5 or the like or otherwise arranged to hold the tube against vibration and from direct contact with the metal. The vertical edge face of the sheath which is adapted to abut against the back face of the instrument panel 6 of the vehicle is open for the reception of the tube; the outer side of the adjacent leg A of the tube lying substantially flush with said edge so as to project slightly into a vertical slot 7 cut in the panel, said slot being shorter than the sheath as shown in Fig. 1.

A graduated scale plate 8 is provided to cooperate with the tube leg A, said plate having a vertical slot 9 through which the central portion of said leg is visible. A horizontal line 10 on the plate to the side of the slot represents the neutral or zero mark of the scale and is intended to aline with the top level of the liquid in the leg A when the liquid is at rest. Above said line is a vertical scale, comprising distinctive markings as 11, having printed notations alongside the same as 12 to indicate different degrees of accelerating efficiency, in an ascending order.

Below the line 10 is another vertical scale of distinctive markings 13, also having printed notations 14 alongside the same and indicating different degrees of braking force in an increasing order from the line 10 down. It will therefore be seen that when the scale or indicating plate and tube are mounted rigid with each other and the car is suddenly speeded up, the liquid in the tube, due to its inertia will rise in the leg A. The extent of such rise will be determined by the acceleration, which in turn is governed by the accelerating force of the engine of the vehicle. As the liquid rises it moves to or past the various markings 11 successively, and the notation 12 of the highest marking to which the liquid rises will indicate the accelerating efficiency of the vehicle.

Similarly, upon applying the brakes sharply the liquid will drop in the tube from its normal level and will move to or past the successive markings 13; and the notation 14 of the lowest marking to which the liquid drops will indicate the degree of braking force. It is here to be noted that the braking scale has been graduated on the basis employed by the California State Highway Patrol, namely the effectiveness of the braking action on a car when traveling at a speed of twenty miles per hour. The construction 3 in the tube leg C prevents a too ready flow of the liquid such as would render the gauge inaccurate and inefficient.

The tube sheath and scale are supported in connection with each other and with the panel 6 in the following manner:

Projecting through the slot 7 (which is wider than the sheath 4) from the outer face of the panel are the legs or sides of a U shaped strap 15 which extends around the back of the sheath and is provided at the ends of its legs with oppositely projecting flanges 16 which overlap the panel to the sides of the slot 7. Set screws 17 in the strap in the back engage the adjacent edge of the sheath 4 to force the same against the panel.

The scale plate 8 together with a transparent cover sheet 18 over the same are supported in a frame 19. The back of this frame is provided with flanges 20 facing each other and adapted to project between the strap flanges 16 and the panel 6, as shown in Fig. 2. The frame 19 is provided with a transverse slot 21 in the bottom between the flanges and immediately behind the same. This slot permits of the insertion of the scale and cover plates, and also enables the frame to be slid into place from the top down, so that the flanges 20 will be received in position relative to the flanges 16.

When thus assembling the parts, the set screws are initially loose, and by then advancing the same, not only will the tube sheath be clamped against the panel, but the frame 19 will also be clamped against the panel. In this manner the parts of the structure are mounted in rigid relationship with each other and with the instrument panel, without the use of any screws or the like through the latter. To adjust the tube so that the liquid level in the tube leg A is normally alined with the scale line 10 regardless of panel slope, it is only necessary to shift the tube vertically relative to the scale, to a proper position before tightening the set screws.

To enable the scale to be properly read against the liquid in the tube from different lateral angles, said plate for the length of the slot 9 and on opposite sides of the same, is bent toward the tube in the form of wings 22 on which the distinctive markings 11 and 13 are extended as indicated in Fig. 1.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. An indicating gauge for a motor vehicle comprising a gauge tube which includes a substantially vertical leg, liquid in the tube partly filling said leg to a predetermined normal level, a sheath about the tube arranged to leave one face of said leg exposed, the side edges of said sheath being adapted to abut against the back side of the instrument panel of the vehicle, said panel having a vertical slot through which said leg is visable, an indicating scale to read against the liquid in said leg and visible from the front side of the panel, a U shaped strap passing about the sheath on opposite sides and whose legs project through the panel slot, outwardly bent flanges on the ends of the strap legs, and an adjustable set screw in the strap at the bend thereof releasably engaging the back of the sheath to clamp the same against the panel.

2. An indicating gauge for a motor vehicle comprising a gauge tube which includes a substantially vertical leg, liquid in the tube partly filling said leg to a predetermined normal level, a sheath about the tube arranged to leave one face of said leg exposed, the side edges of said sheath being adapted to abut against the back side of the instrument panel of the vehicle, said panel having a vertical slot through which said leg is visible, an indicating scale plate to read against the liquid in said leg disposed on the front side of the panel and having a vertical slot through which the tube leg is visible, a frame about said plate supporting the same, a U shaped strap passing about the sheath on opposite sides whose legs project through the panel slot, an adjustable set screw in the strap at the bend thereof engaging the back of the sheath, and means between the strap and framed panel whereby upon advancing the set screw, the frame and sheath will both be clamped against the corresponding sides of the instrument panel.

3. An indicating gauge for a motor vehicle comprising a gauge tube which includes a substantially vertical leg, liquid in the tube partly filling said leg to a predetermined normal level, a sheath about the tube arranged to leave one face of said leg exposed, the side edges of said sheath being adapted to abut against the back side of the instrument panel of the vehicle, said panel having a vertical slot through which said leg is visible, an indicating scale plate to read against the liquid in said leg disposed on the front side of the panel and having a vertical slot through which the tube leg is visible, a frame about said plate supporting the same, a U shaped strap passing about the sheath on opposite sides whose legs project through the panel slot, an adjustable set screw in the strap at the bend thereof engaging the back of the sheath, flanges on the ends of the strap legs overlapping the panel to the sides of the slot therein, and flanges on the scale frame behind the scale projecting between the panel and said strap flanges.

JOHN R. ELSOM.